Apr. 3, 1923. 1,450,809
G. L. LAMB
VISOR FOR USE WITH AUTOMOBILES
Filed Jan. 20, 1922 2 sheets-sheet 1
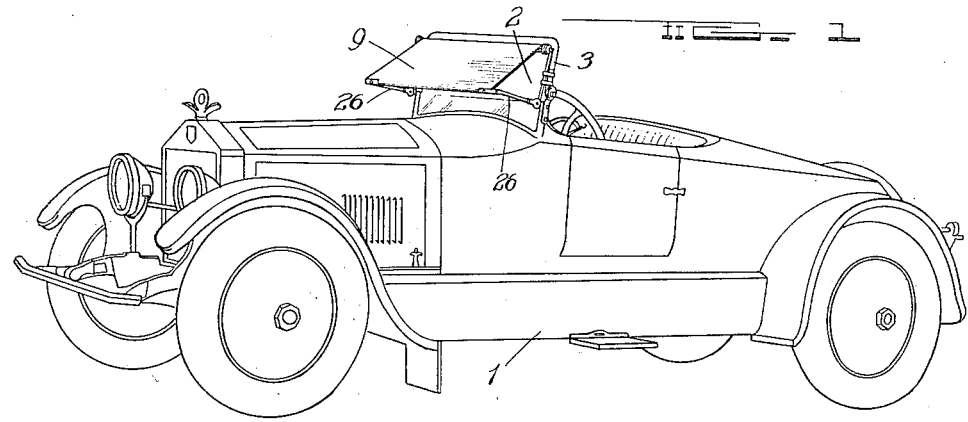
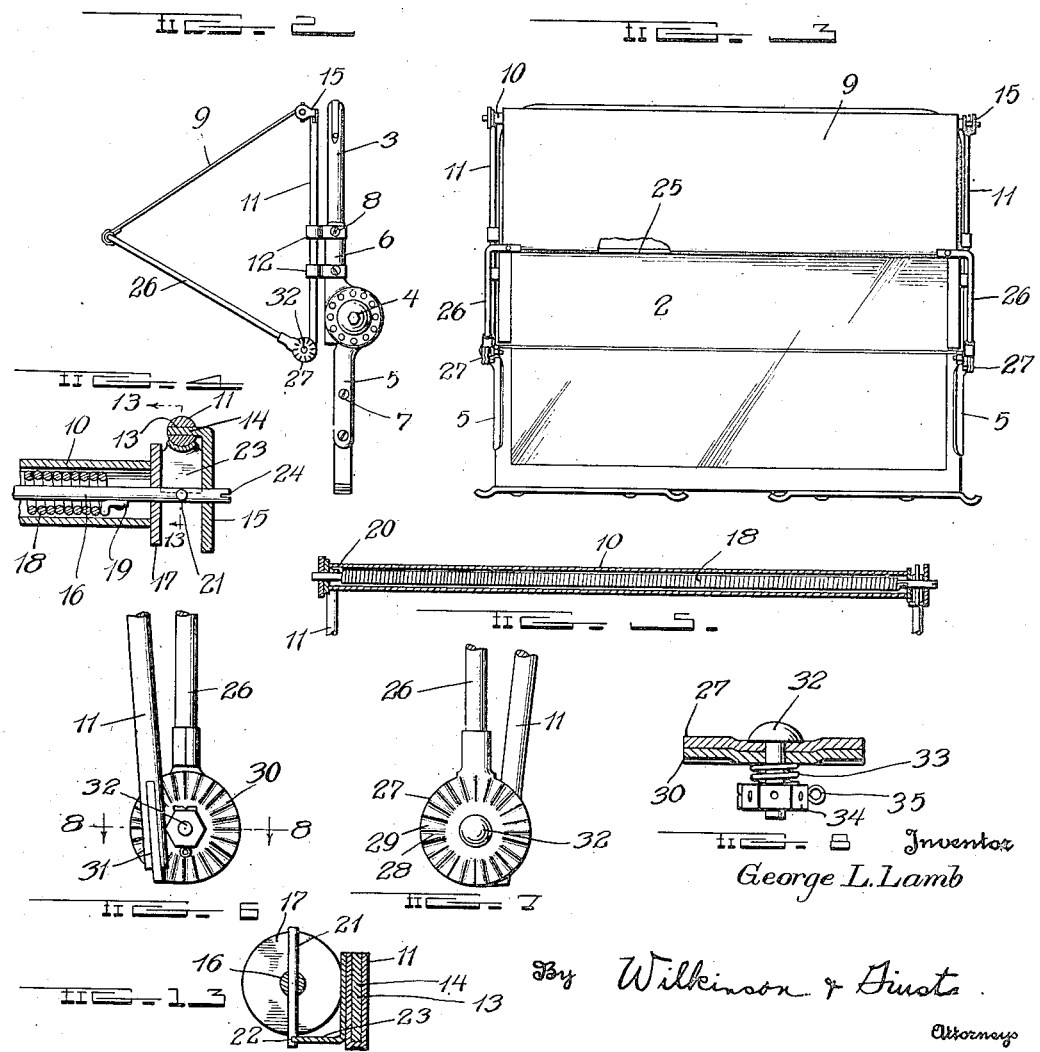
Inventor
George L. Lamb
By Wilkinson & Fisher
Attorneys Apr. 3, 1923.
G. L. LAMB
1,450,809
VISOR FOR USE WITH AUTOMOBILES
Filed Jan. 20, 1922    2 sheets-sheet 2
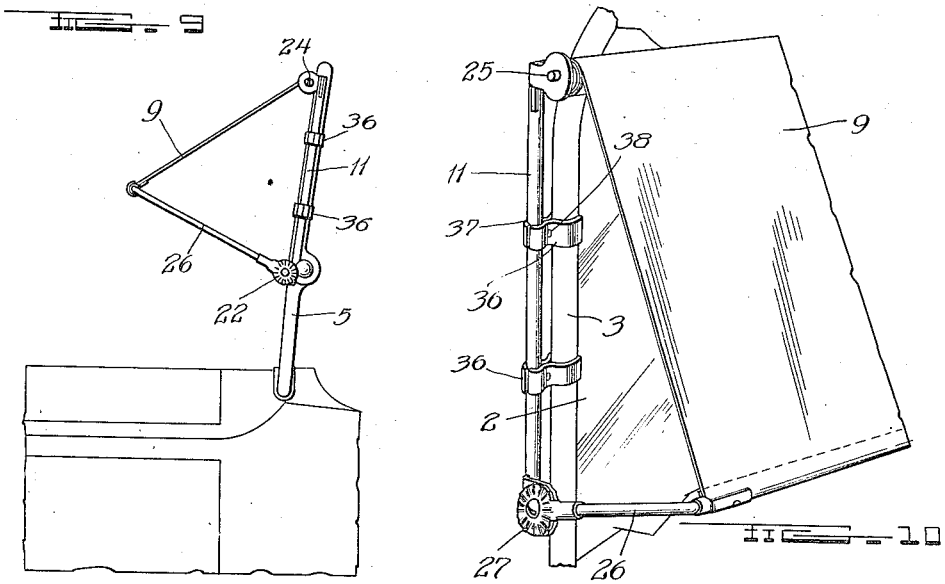
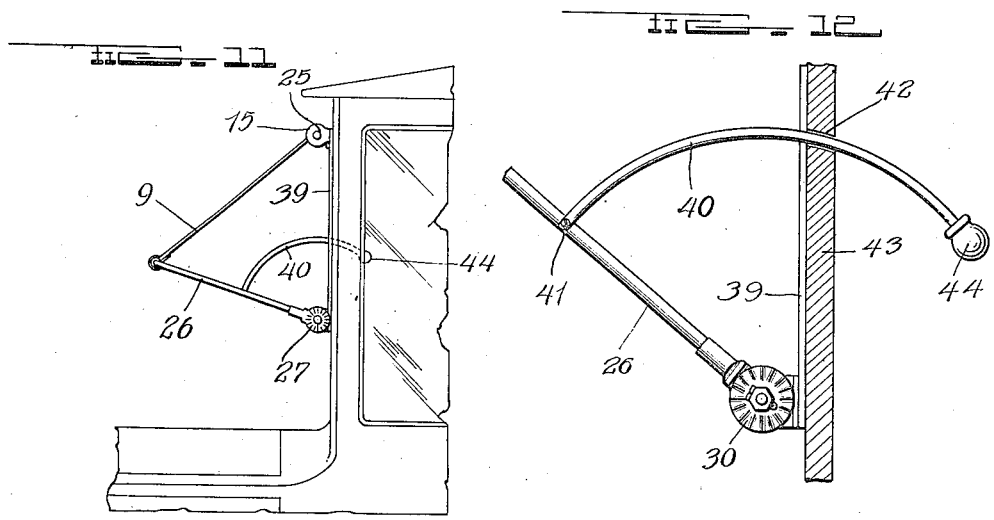
Inventor
George L. Lamb
By Wilkinson & Giusta
Attorneys Patented Apr. 3, 1923.

1,450,809

UNITED STATES PATENT OFFICE.

GEORGE L. LAMB, OF NAPPANEE, INDIANA.

VISOR FOR USE WITH AUTOMOBILES.

Application filed January 20, 1922. Serial No. 530,593.

*To all whom it may concern:*

Be it known that I, GEORGE L. LAMB, a citizen of the United States, residing at Nappanee, in the county of Elkhart and State of Indiana, have invented certain new and useful Improvements in Visors for Use with Automobiles; and I do hereby declare the following to be a full, clear, and exact description of the invention, such as will enable those skilled in the art to which it appertains to make and use the same.

The present invention relates to improvements in visors for use with automobiles and more particularly relates to a shade for the wind shield so mounted and constructed as to be capable of rolling or folding completely out of the way when not in use and of being adjusted to extend down and forwardly a desired distance to cut off the rays of the sun from the eyes of the driver or to shield the driver's compartment from driving rain or the like.

An object of the invention is to provide an improved wind shield visor of this character which is assembled as a unit and capable of attachment to the wind shield or adjacent parts and which may be folded in a compact space.

Another object of the invention is to provide a visor which will permit of easy and noiseless operation and will not be apt to rattle, and which may be constructed and sold at relatively small cost.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a perspective view showing an automobile having the improved wind shield visor thereon;

Fig. 2 is an enlarged side view of the wind shield with the visor adjusted to one position;

Fig. 3 is a front view thereof;

Fig. 4 is an enlarged fragmentary sectional view through a portion of the spring roller and its support;

Fig. 5 is a longitudinal sectional view through the spring roller;

Fig. 6 is a fragmentary side view of the clamping or holding device;

Fig. 7 is an opposite side view of the same;

Fig. 8 is a transverse section taken on the line 8—8 in Fig. 6;

Fig. 9 is a fragmentary side view of an automobile with a slightly modified form of clamping attachment;

Fig. 10 is a fragmentary perspective view of the wind shield with this same clamping attachment;

Fig. 11 is a fragmentary side elevation of a sedan showing the improved attachment applied thereto with a slightly modified form of support;

Fig. 12 is an enlarged vertical sectional view of the operating means; and,

Fig. 13 is a section on line 13—13 in Fig. 4.

Referring more particularly to the drawings, 1 designates generally a motor vehicle having a wind shield represented at 2 formed of one or more glass sections or panels held in a metallic frame 3. In the construction shown in Figs. 1, 2 and 3, the wind shield is made in upper and lower sections which are pivotally associated to permit of the folding of the upper section about a center 4 provided by cooperating hinge leaves 5 and 6 attached respectively to the lower and upper sections as by screws or similar fastenings 7 and 8.

In accordance with the present invention, a visor is provided of a flexible fabric 9 wound upon a roller 10 which is suitably carried by supports or rods 11 held for instance by clamps 12 to the upper hinge leaf 6. The supporting bars 11 are slidable vertically in the clamps 12 to permit of the vertical adjustment of the entire visor with respect to the wind shield and portion of the top of the automobile which projects beyond the upper edge of the wind shield, in this way permitting of the close fitting of the roller 10 beneath the projecting forward part of the top where the device will be out of the way and entirely clear of the vision when folded and not in use, and to make it as little as possible in evidence, although it constitutes an attractive accessory.

The usual screws or bolts 8 which hold the top section of the wind shield to the hinge leaf 6 may be employed to also fasten the clamps 12. Or possibly longer bolts may be substituted for those usually employed to take care of the extra thickness of the clamps. The two supporting bars 11, one at each side of the wind shield, are divided at their upper ends as indicated in Fig. 4, to provide slots 13 to receive the right angularly turned ends 14 of perforated ears 15 which project forwardly from the supporting bars and are positioned to slidingly receive the rod or shaft 16 which passes axially through and supports the roller 10. Heads 17 are secured to the ends of the roller 10 and are perforated to bear upon the shaft or rod 16.

A coil spring 18 is wound about the shaft or rod 16 and lies within the roller 10, being secured to the shaft or rod 16 at one end as indicated at 19 and being at its other end 20 fastened to the roller 10. The shaft or rod 16 is secured against rotary movement by an appropriate device and for this purpose a pin 21 is passed transversely through the shaft or rod at one end between the head 17 and adjacent ear 15, the pin being slotted as indicated at 22 to receive the elongated edge of a stop bracket 23 held in any suitable manner by the adjoining supporting rod 11. The edge of the stopping bracket 23 may therefore be slid along in the slot 22 of the pin 21 as where the arms 11 are moved closer together or farther apart to admit of the visor attachment being applied to varying widths of wind shields.

The ears 15 have a sliding engagement with the shaft 16 for this same purpose, and the shaft will be made long enough to extend completely across the widest of wind shields. The slot 22 in the pin 21 will also avoid the possible disengagement of the pin from the stop bracket 23 and will insure that the shaft does not rotate. At least one end of the shaft or rod 16 is slotted as indicated at 24 to admit an implement such as a screw driver or coin to facilitate the turning of the rod or shaft as when the coil spring 18 is to be initially wound, it being understood that the pin 21 is withdrawn or at least disengaged from the stop bracket when this operation is performed.

The outer edge portion of the visor fabric 9 has a rod 25 extending through a loop made therein and to the ends of this rod are connected the bracket arms 26 which pivot about the lower portions of the supporting rods 11. The lower ends of the bracket arms 26 carry corrugated disks 27 having alternate crests 28 and troughs 29 closely associated and extending in a radial direction and in a similar manner the lower end of the supporting arms 11 are provided with complemental corrugated disks 30 interfitting with the disks 27. One edge portion of each of the disks 30, which incidentally preferably lie inwardly of the disks 27, are turned laterally and inserted in the bifurcated lower end 31 of each supporting rod 11 by which the disk is clamped in place.

A bolt or pivot 32 passes through each pair of disks 27 and 30 and carries a coil spring 33 interposed between the inner face of the disk 30 and a nut 34 which is run upon the pivot bolt 32 and secured against casual turning by cotter pin or other appropriate device 35. The coil spring urges the two disks together and causes the crest portions of the one to engage in the corresponding troughs of another. The angular adjustment of the bracket arms 26 is thus maintained by the engagement of the disks and it is only by applying manuel force to rotate the arms 26 that the adjustment will be disturbed, but accidental vibration incident to the oridinary travel of the vehicle will not be sufficient to cause the relative rotation of the two disks. The degree of the binding action between the two disks may be controlled by the tension imposed on the spring 33 and this is under the direct control of the nut 34.

In the use of a device of this character, the arms 26 may be drawn down for instance to the position indicated in Figs. 1 and 2, and the fabric 9 will thus be stretched at an angle downwardly and outwardly from the front upper portion of the wind shield and will shield the driver's eyes from the rays of the sun or from glaring head lights and will further under different weather circumstances prevent rain, snow or sleet from striking the wind shield which is known to be a common source of annoyance and danger.

If it becomes preferable under the circumstances that the visor shall not extend as low as indicated in Figs. 1, 2 and 3, then the arms 26 may be raised by applying a suitable force thereto which will pry the disks 27 and 30 axially apart in the movement of the crest of one disk over the opposite crest of a companion disk and the coil spring 33 will be compressed under this action and will yield under these circumstances. When no visor is required, the fabric 9 may be rolled completely upon the roller 10 and it is understood that when the fabric 9 is drawn out that it will wind the spring 18 and put it in a potential condition such as to roll the fabric 9 back upon the roller 10 when the arms 26 are released upwardly.

In Figs. 9 and 10 there is shown a slightly modified form of the attaching means in which two part flanges are used, the complemental parts of these flanges being represented at 36 and 37. On end portion of each clamp is shifted to fit upon the side portion of the wind shield frame 3 while the other end portion of each clamp is adapted to embrace the supporting rod 11 and to hold it laterally of the wind shield and in substantially the same plane with the glass 2. A suitable central fastening 38 is provided to hold the clamp sections together. This also provides for the vertical adjustment of the supporting rods 11 and admits of raising and lowering the visor as a whole. The remaining parts of the device are similar to those already described and are similarly numbered.

Coming now to Figs. 11 and 12, the device is shown applicable to a sedan or other closed body. In this instance, the ears 15 which support the roller and shaft are carried by flat supporting bars 39 secured in any suitable manner to the front posts or stanchions which support the body of the sedan, coupe or the like body. The bracket arms 26 in this instance are not so directly accessible to the hand of an occupant of a vehicle and consequently I prefer to provide curved operating rods 40 pivoted at 41 to the bars 26 and extending through slots 42 in the posts or stanchions 43 above referred to, whereby the inner rear ends of the operating rods may terminate within the enclosure of the body and be equipped with suitable knobs or hand pieces 44 to enable the driver or other occupant of the front seat of the vehicle to raise and lower the bracket arms 26 by pulling or pushing upon the operating rods 40.

It will be appreciated from the foregoing that the above described device forms a unit separate and independent from the construction of the vehicle to which it is to be attached, and that it may be manufactured and sold as an accessory and by reason of its adjustable character, may be applied to various styles and shapes of wind shields used upon the different makes of automobiles, and that when mounted in place it affords every convenience to the protection of the driver and the wind shield glass from the rays of the sun and from rain, sleet and snow.

The shipment of the device may be made at relatively small cost by reason of the compact character of the visor as the arms 26 are folded against the supporting rods 11. In this condition, the device is substantially flat. The character of the construction is also proof against rattling or noise which would make it objectionable, it is attachable quickly and conveniently and the character of the corrugated disks provides for easy adjustment of the visor, at the same time securing the fabric firmly without vibration in the position to which it has been set.

The ear supporting structure for the roller shaft is also compact, contains few parts and yet admits of the lateral expansion or contraction of the device to compensate for varying widths in the wind shield.

It is obvious that various changes and modifications may be made in the details of construction and design of the above specifically described embodiment of this invention without departing from the spirit thereof, such changes and modifications being restricted only by the scope of the following claims:

What is claimed is:

1. A visor for automobiles comprising a pair of uprights carried by the vehicle at opposite sides of the wind shield glass, a shaft journaled to rotate in the upper ends of said uprights, a roller free on the shaft, a spring wound about the shaft and attached at one end to the roller and at the other end to the shaft, a pin secured to the shaft, a bracket carried by one of the uprights and projecting toward the shaft and engaged by said pin to avoid rotation of the shaft, a shade wound on the roller, and arms connected to the free end of the shade and pivoted to the lower ends of the uprights.

2. A visor for automobiles comprising a pair of uprights removably attached to the side portions of the wind shield frame, said uprights having forwardly projecting ears at their upper ends, a shaft journaled to rotate in said ears, a roller free to rotate on the shaft, a spring wound about the shaft and attached at one end to the roller and at the other to the shaft, a notched pin passing through the shaft, a bracket carried by one of said uprights and projecting forwardly beneath the shaft and having an edge received into the notch of the pin, a shade wound on the roller, and arms connected to the free end of the shade and adjustably pivoted to the lower ends of the uprights.

3. A visor for automobiles comprising a pair of uprights attached to the vehicle at opposite sides of the windshield glass, said uprights having forwardly projecting ears at their upper ends and brackets adjacent the ears, a shaft journaled to rotate in said ears, a roller free on the shaft, a spring wound about the shaft and attached at one end to the roller and at the other to the shaft, a pin secured to the shaft having a notch to receive the edge of the bracket, a shade wound on the roller, and arms connected to the free end of the shade, and pivoted to the lower ends of the uprights.

GEORGE L. LAMB.